No. 754,367. PATENTED MAR. 8, 1904.
E. FLAGLER.
HANGER.
APPLICATION FILED JUNE 17, 1901.
NO MODEL.
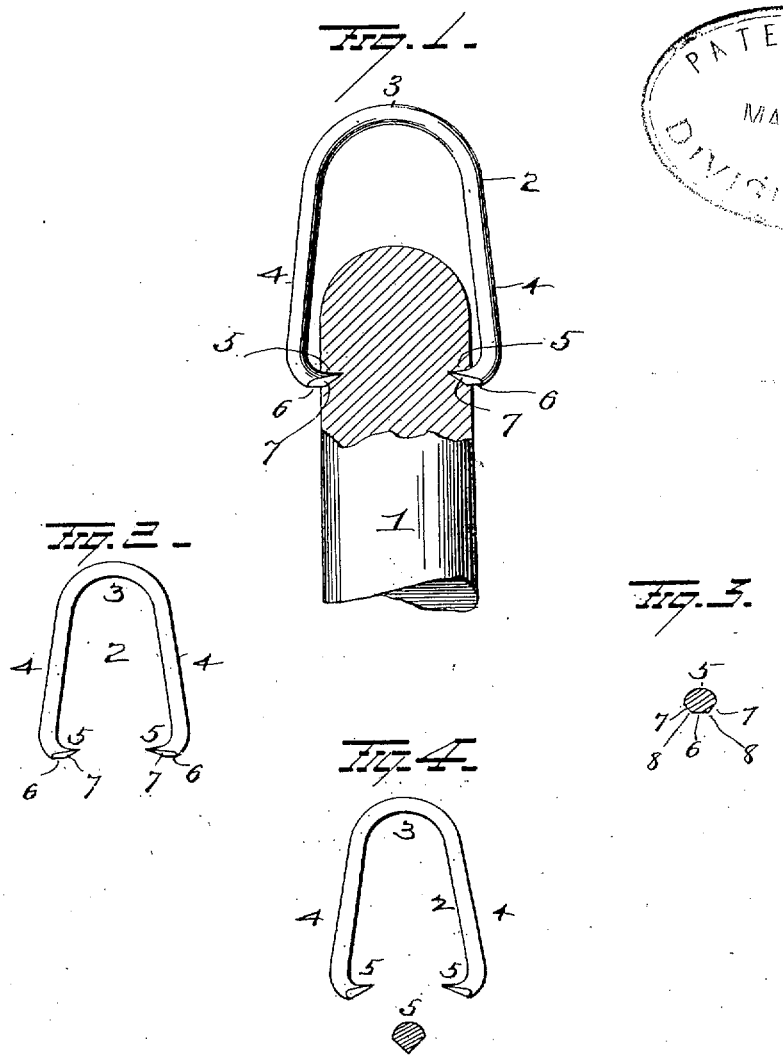
WITNESSES
E. J. Nottingham
G. F. Downing
INVENTOR
E. Flagler
By H. A. Seymour
Attorney EMORY FLAGLER, OF LOCKPORT, NEW YORK, ASSIGNOR OF ONE-HALF TO ROY E. FLAGLER, OF WILMINGTON, DELAWARE.

HANGER.

SPECIFICATION forming part of Letters Patent No. 754,367, dated March 8, 1904.

Application filed June 17, 1901. Serial No. 64,920. (No model.)

*To all whom it may concern:*

Be it known that I, EMORY FLAGLER, a resident of Lockport, in the county of Niagara and State of New York, have invented certain new and useful Improvements in Hangers; and I do hereby declare the following to be a full, clear, and exact description of the invention, such as will enable others skilled in the art to which it appertains to make and use the same.

My invention relates to an improvement in hangers, and more particularly to improved broom-hangers, the object of the invention being to provide an improved hanger which will be extremely simple in construction, cheap to manufacture, easily secured on a broom or other handle and detached therefrom, and which when in position on a handle will secure itself thereto without previous preparation of the handle.

With this object in view the invention consists in certain novel features of construction and combinations and arrangements of parts, as will be more fully hereinafter described, and pointed out in the claim.

In the accompanying drawings, Figure 1 is a perspective view illustrating my improvement attached to a broom-handle. Fig. 2 is a view of the hanger detached. Fig. 3 is a view in section through one of the teeth or prongs of the hanger, and Fig. 4 is a view of a modified form of tooth or prong.

1 represents a broom-handle of ordinary construction, and 2 my improved hanger attached thereto. The hanger 2 comprises a spring-wire bent between its ends to form a bail, as shown at 3, and forming two spring-arms 4, the ends of which are bent inward toward each other, forming prongs or teeth 5, said bail being wider at a point in proximity to the teeth than at the upper end of the bail, so that when the bail is hung on a nail the weight of the broom will tend to force the teeth into the wood of the handle. These prongs or teeth 5 are filed or otherwise cut to form flat lower faces, as shown at 6, and the side portions are beveled off, as shown at 7, forming a sharp point and sharp angular cutting edges 8, which as the hanger is swung backward and forward on the handle serve to cut out the wood of the handle, enlarging the holes and more securely holding the hanger in place. Instead of flattening the lower face of the prongs or teeth they may be beveled on opposite sides, as shown in Fig. 4, to form the cutting edges and sharp points.

To place the hanger on a broom-handle, the handle is grasped in one hand and the hanger in the other, one prong or tooth 4 being placed against the broom-handle the proper distance from the end, and the hanger, which is disposed at right angles to the handle, is forced around the same until the other tooth or prong is opposite the first-mentioned, when by swinging the hanger back and forth several times over the end of the handle the sharp cutting edges and point of the prongs will cut into the handle and secure the hanger thereto.

It will thus be seen that with my improvements it is not necessary to bore holes or otherwise make sockets in the handle to receive the prongs, as they will make their own impression in the wood, and the longer the hanger remains on the handle the more securely it will fasten itself. However, by simply pulling one prong out of the handle and then the other the hanger can be readily removed and placed on another article.

The hanger may instead of being attached to the broom-handle near its end be attached to the handle between its ends. It may also with equal effectiveness be employed as a hanger for other articles. Its simplicity of construction, perfect operation, and easy method of attachment dispensing with any necessity for preparation therefor recommends it as unquestionably a vast improvement over all hangers heretofore known.

The points or teeth on the hanger may be formed in a great many ways—as, for instance, by filing, cutting, or stamping the metal into the shape desired—and it will also be seen that when the broom is in use the hanger will lie against the handle and out of the way.

Various slight changes might be made in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

A hanger comprising an approximately U-shaped spring-wire bail, the free ends of the arms of said bail being bent inwardly forming teeth having pointed ends, and beveled lower side faces to form cutting edges, and each tooth having a flat bottom face.

In testimony whereof I have signed this specification in the presence of two subscribing witnesses.

EMORY FLAGLER.

Witnesses:
DONALD S. MOORE,
LUTHER REEVUS.